April 14, 1925. Re. 16,043

H. F. JOSEPH

INTERNAL GRINDING MACHINE

Original Filed Aug. 7, 1920 5 Sheets-Sheet 1

INVENTOR
Harry F. Joseph
BY Davis & Davis
ATTORNEYS

April 14, 1925. Re. 16,043

H. F. JOSEPH

INTERNAL GRINDING MACHINE

Original Filed Aug. 7, 1920 5 Sheets-Sheet 2

INVENTOR
Harry F. Joseph
BY Davis & Davis
ATTORNEYS

April 14, 1925. Re. 16,043

H. F. JOSEPH

INTERNAL GRINDING MACHINE

Original Filed Aug. 7, 1920 5 Sheets-Sheet 3

INVENTOR
Harry F. Joseph
BY Davis & Davis
ATTORNEYS

April 14, 1925. Re. 16,043

H. F. JOSEPH

INTERNAL GRINDING MACHINE

Original Filed Aug. 7, 1920 5 Sheets-Sheet 4

INVENTOR
Harry F. Joseph
BY Davis & Davis
ATTORNEYS

April 14, 1925. Re. 16,043
H. F. JOSEPH
INTERNAL GRINDING MACHINE
Original Filed Aug. 7, 1920 5 Sheets-Sheet 5
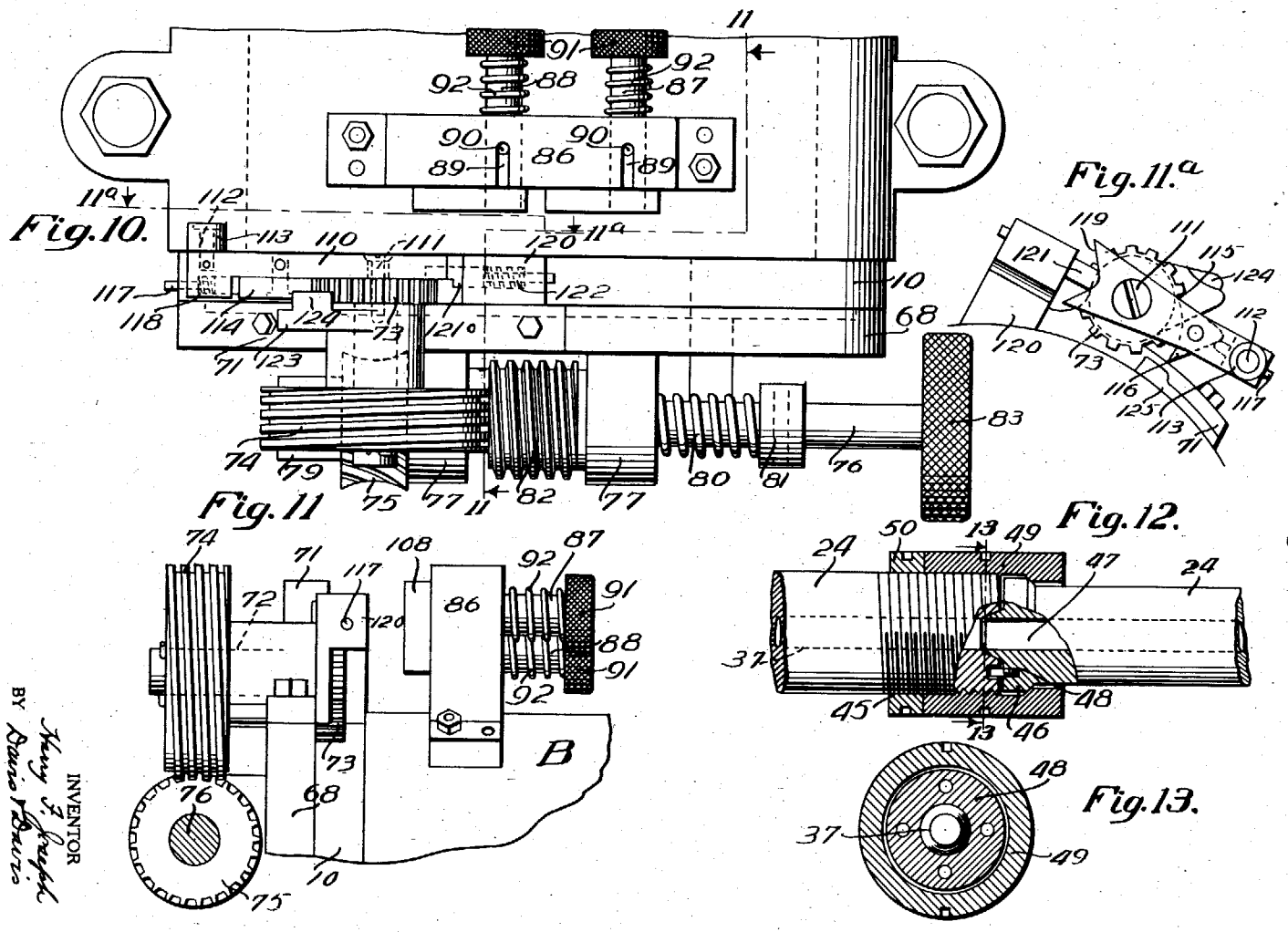
INVENTOR
Harry F. Joseph
BY Davis & Davis
ATTORNEYS Reissued Apr. 14, 1925. Re. 16,043

UNITED STATES PATENT OFFICE.

HARRY F. JOSEPH, OF DAVENPORT, IOWA, ASSIGNOR, BY MESNE ASSIGNMENTS, TO MICRO MACHINE COMPANY, OF BETTENDORF, IOWA, A CORPORATION OF IOWA.

INTERNAL-GRINDING MACHINE.

Original No. 1,396,123, dated November 8, 1921, Serial No. 401,988, filed August 7, 1920. Application for reissue filed September 7, 1923. Serial No. 661,534.

*To all whom it may concern:*

Be it known that I, HARRY F. JOSEPH, a citizen of the United States, residing at Davenport, in the county of Scott and State of Iowa, have invented certain new and useful Improvements in Internal-Grinding Machines, of which the following is a specification, reference being had to the accompanying drawings.

This invention has relation to that type of grinding machines in which the grinding-wheel spindle is not only rotated axially but is given an orbital movement to cause the grinding-wheel while rapidly rotating to follow the contour of a cylindrical surface. During the operation of the machine, the spindle and the wheel are in addition given a feeding motion, i. e., a step-by-step movement either radially inward or radially outward, according to whether the wheel is operating upon an external surface or an internal surface. I have shown and described mechanism for imparting this feeding action to the spindle and the grinding-wheel, but this mechanism is covered by my copending divisional application, Serial No. 506,300.

The present invention has relation to means for maintaining a continuous supply of water to the point of attrition, to thereby not only keep the wheel and the work cool but also to wash away the detritus. It has been known for sometime that this wet grinding is advantageous, but no one has ever succeeded in practically applying it to the type of grinder hereinbefore described. It is the object of the present invention to provide a simple and efficient means for maintaining a continuous stream of water at the grinding-point of sufficient force and volume to keep the wheel and the work cool and at the same time wash away the grit, so as to always maintain the grinding-surface clean, whereby I am enabled not only to perform the grinding operation economically but also to obtain a very high degree of smoothness and precision in the work, as more fully hereinafter set forth.

Other objects will appear in the course of the following description.

My invention is illustrated in the accompanying drawings, wherein:—

Fig. 6 is a fragmentary longitudinal sectional view through the forward end of the spindle and the grinding wheel mounted thereon;

Fig. 7 is a section on the line 7—7 of Fig. 6;

Fig. 10 is a top plan view of the construction shown in Fig. 8;

Fig. 11 is a sectional view on the line 11—11 of Fig. 10;

Figures 8, 9, 15:
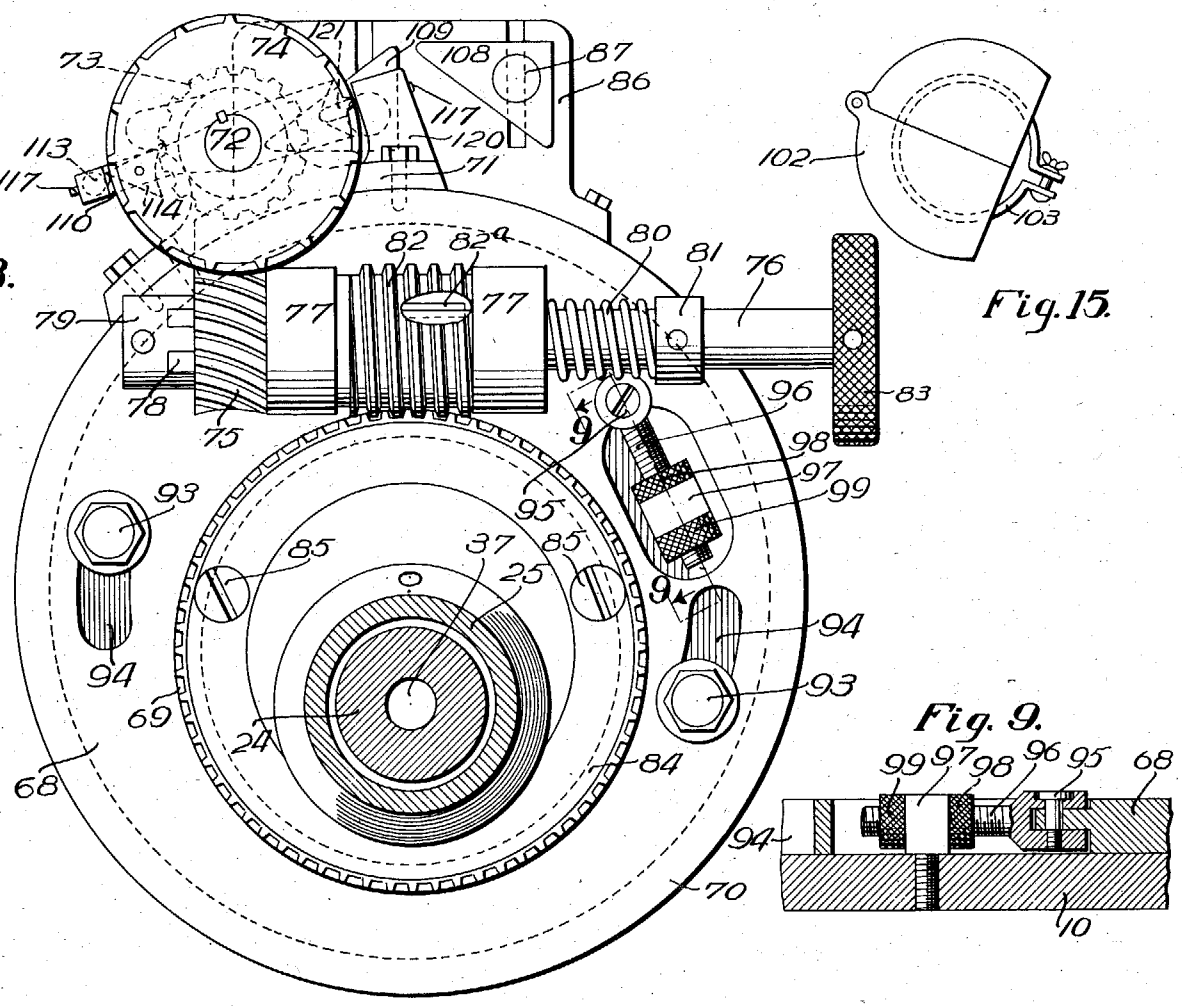
Fig. 8 is a section on the line 8—8 of Fig. 3 but showing the spindle in its lowermost position.
Fig. 9 is a sectional view on the line 9—9 of Fig. 8.

Fig. 11[a] is a fragmentary elevation looking from the rear of the feeding mechanism illustrated in Fig. 8;

Fig. 12 is a detail elevation partly in section of the joint between the spindle members 24 and 37;

Fig. 13 is a section on the line 13—13 of Fig. 12;

Fig. 14 is an elevation of the guard 102 in applied position, the spindle housing being broken away;

Fig. 15 is a detail side elevation of the guard with its shank.

Figure 1:
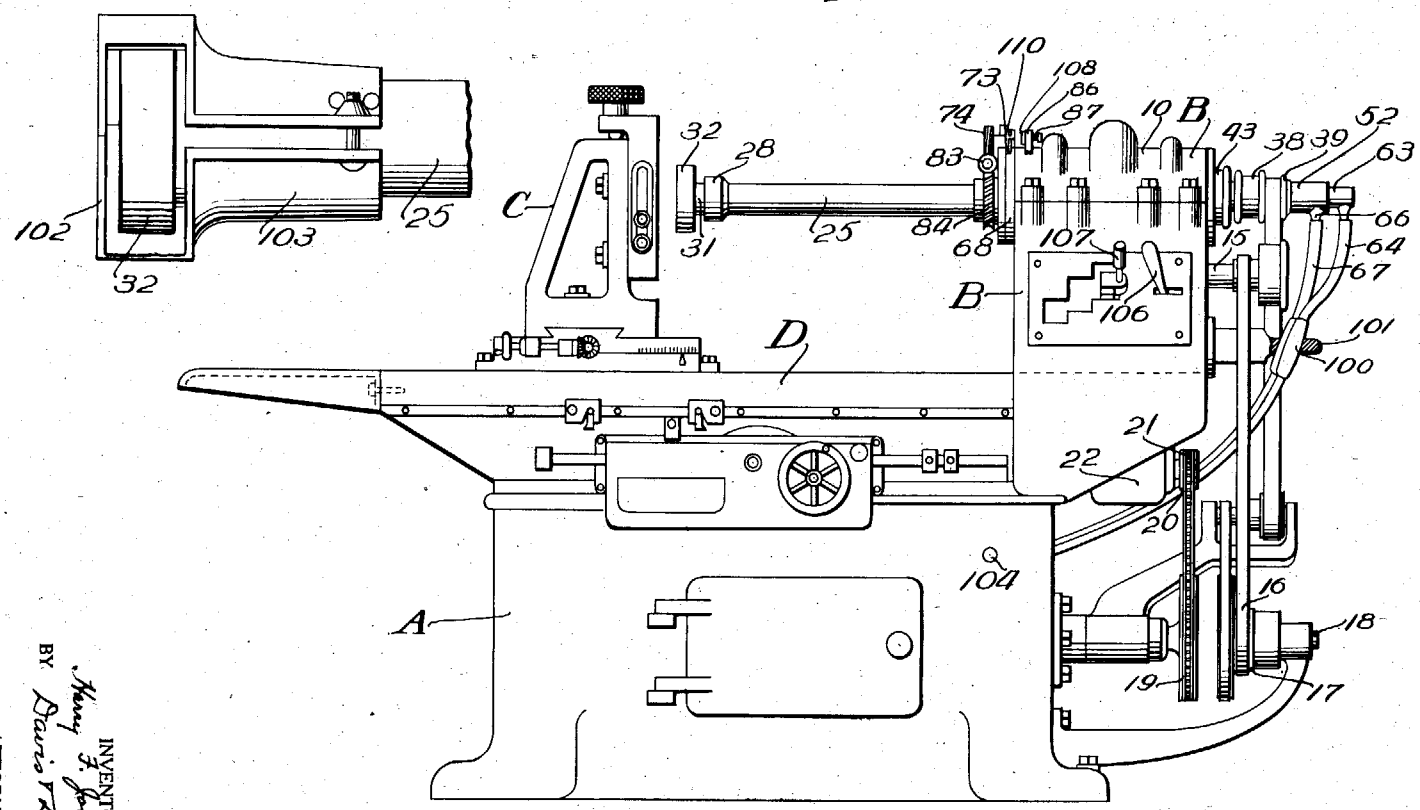
Figure 1 is a side elevation of an internal grinding machine constructed in accordance with my invention.

Referring to the drawings, and particularly to Fig. 1, it will be seen that my mechanism as a whole includes the base A, a supporting column B wherein the spindle and spindle operating mechanism is supported, as will be later described, and a work support C which is mounted for longitudinal movement upon the power driven table D and consists of a plurality of relatively adjustable sections whereby the work may be shifted longitudinally of the table, transversely of the table, or rotated relative to the longitudinal axis of the table, and whereby the work may be held at any desired elevation. This mechanism, which I have designated generally A, B, C and D forms no part of my invention, my present invention residing in the means whereby the spindle carrying the grinding head is rotated and given a bodily movement around a central axis, and whereby water is supplied to the grinding wheel.

Figure 3:
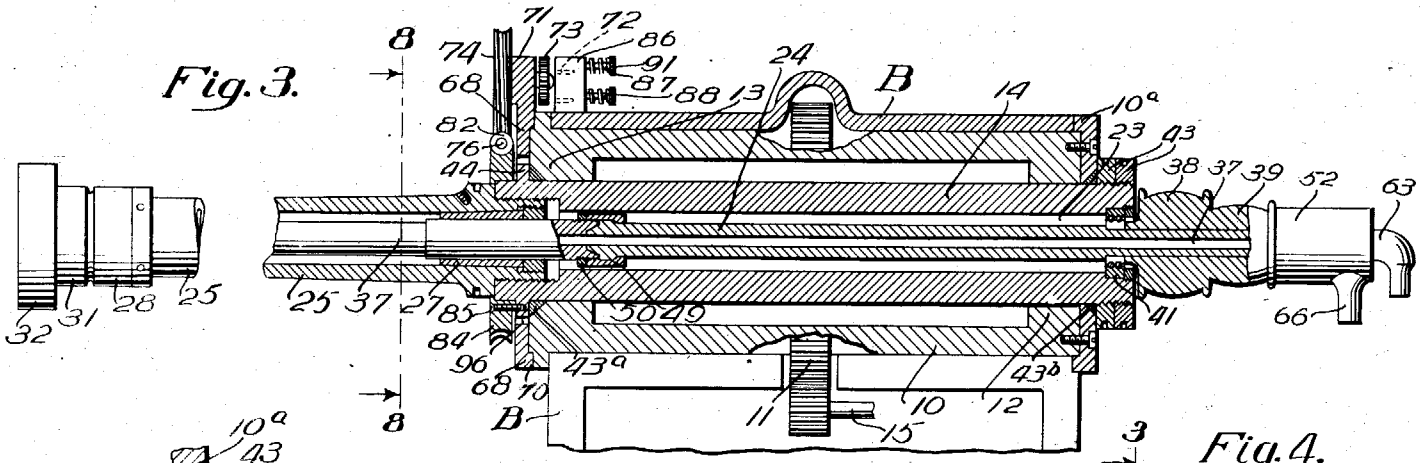
Fig. 3 is a fragmentary vertical sectional view through the housing 10 and a portion of the base B taken on the line 3—3 of Fig. 4.

Referring to Fig. 3, it will be seen that the column B has rotatively mounted therein an approximately cylindrical carrier 10 which is provided intermediate its ends with the gear 11. This cylindrical carrier is provided at its ends with the inwardly directed, annular flanges 12 and 13 forming bearings for a spindle housing 14. This member 10 may be rotated by any suitable mechansm, but I have illustrated for this purpose a shaft 15 carrying a pinion or gear wheel engaging the gear wheel 11 and driven by a belt or sprocket chain 16, in turn operating over a belt wheel or sprocket wheel 17 carried upon the shaft 18 driven by a sprocket chain 19 from a sprocket wheel 20 on a motor shaft 21, the motor being designated 22. I do not wish to be limited, however, to the particular means for driving the member 10. This member is entirely inclosed within the housing formed by the column B and the cap B′ thereof.

Figure 4:
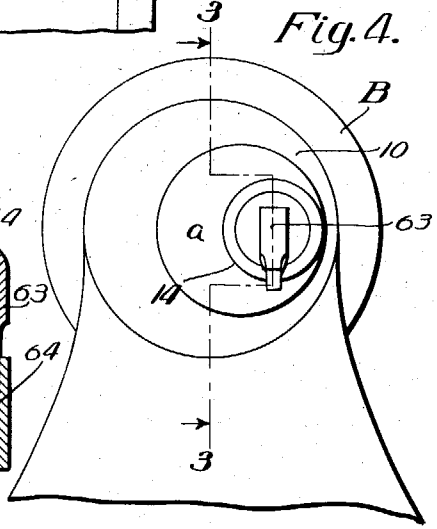
Fig. 4 is a detail rear elevation of the housing and bearings for the spindle.

Disposed within the cylindrical carrier 10, as previously stated, is the spindle housing 14, which is annular in cross section, and this spindle housing 14, as indicated clearly in Fig. 4, is eccentrically disposed with relation to the carrier 10 so that as this carrier 10 rotates in the direction of the arrow in Fig. 4, the spindle housing will be carried bodily around the axis *a*, and it will be seen from Fig. 3 that this spindle housing 14 has a passage 23 which is eccentric to the periphery of the spindle housing. Extending through this passage 23 is a spindle, designated generally 24, and which, as illustrated, is composed of the two sections. This spindle is considerably longer than the spindle housing and projects beyond the spindle housing both at its forward and rear ends. Extending from the body 14 of the spindle housing is the front spindle housing 25 within which the forward portion of the spindle 24 is disposed and in which it is rotatably mounted. The forward end of the spindle 24 is mounted in exteriorly conical bearings 26, (see Fig. 6) while that portion of the spindle coincident with the rear end of the forward spindle housing 25 is mounted in bearings 27 which are likewise conical.

The forward end of the housing 25 is screw-threaded, and engaged therewith is a collar 28 having an annular flange 29 extending over the end of the bearing 26 and by rotating this collar it is obvious that the wear on the bearing may be taken up. The spindle is reduced at this point, as at 30, and surrounding the reduced portion of this spindle and bearing against the forward flange 29 of collar 28 and extending over the forward portion of this collar 28 is a dust cap 31 which rotates with the spindle 24. Surrounding the body of the dust cap 31 is the grinding wheel 32 which may be an emery grinding wheel or carborundum grinding wheel, or a grinding wheel of any suitable character, the face of this grinding wheel being cut out at its center, as at 33. The extremity of the spindle 24 is screw-threaded, and engaging this screw-threaded portion is a nut 34 having radially extending, relatively shallow passages 35, (see Fig. 7) and riveted to this nut is a plate 36. The spindle has a longitudinally extending bore 37 by which water is supplied to the grinding wheel, and this bore flares toward its forward end and discharges water into the radial ducts 35 and by these radial ducts the water is discharged against wheel 32 and carried outward by centrifugal action against the work.

Figure 5:
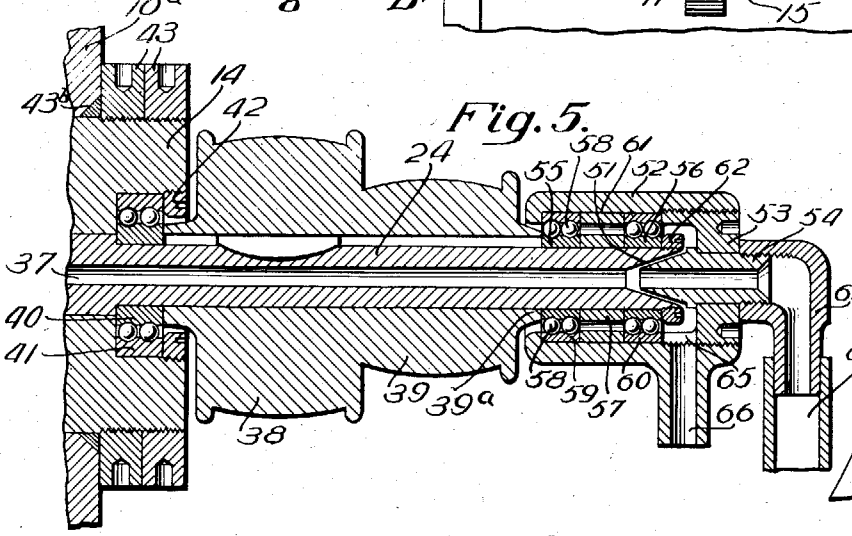
Fig. 5 is a fragmentary vertical sectional view through the rear end of the spindle and the bearings therefor showing the water ducts in section.

The rear end of the spindle 24 projects beyond the cylindrical housing 14. This housing 14 is cut out at its rear end to receive certain ball bearings, as will be later stated, and mounted upon the spindle 24 are the two connected driving pulleys 38 and 39 which are keyed or otherwise connected to the spindle 24 to rotate therewith. The ball bearing for the support of the rear end of the spindle may be of any suitable construction, and as illustrated in Fig. 5 comprises an inner member 40, the outer annular member 41, and the intermediate anti-friction element, such as anti-friction balls. This ball bearing is held in place by means of a jam nut 42 exteriorly threaded to engage the interior threads on the recess formed in the rear end of the housing 14, as most clearly illustrated in Fig. 5. The rear end of the housing 14 is exteriorly screw-threaded for engagement by the nuts 43, whereby the housing is held in proper relation to the rotatable carrier 10, which has an annular plate $10^a$ attached to it by screws and against which the nuts 43 bear, the forward end of the housing section 14 having a flange 44 which bears against the split ring $43^a$. The nuts 43 pull the spindle housing 14 against the split ring $43^a$ on the forward end of the spindle housing and push the rear split ring $43^b$ against end flange plate $10^a$. This insures perfect bearing at all times. Thus, the housing section 14 is supported for relatively rotary movement within the rotatable carrier 10 and the spindle is supported for rotation around its own axis within the housings 14 and 25. Preferably this spindle is formed in two sections, as shown in Fig. 12, one of the sections being screw-threaded, as at 45, the other section having a head 46 of the same diameter as the screw-threaded section, this head being formed with a central, conical boss 47 seating within the end of the other section, and these two parts being held from relative rotation by pins 48. The two sections are held together by a flexible coupling member 49 having a flange to engage over the head 46 and being interiorly screw-threaded to engage over the screw-threads 45. This coupling member is held in place by a jam nut 50.

It will be noted from Fig. 12 that the exterior face of the boss 47 is slightly curved or struck on a radius and that the rear face of the shoulder 46 also has a curve corresponding to the radius of the curvature on the outer face of the boss 47 to thereby allow for flexibility in the coupling at this point, the pins 48 being relatively loose in the sockets formed in the part 24 to permit this.

At its rear end, the spindle carries means whereby it may be connected to a water supply pipe and to a pipe for carrying off excess water, and to this end, as illustrated in Fig. 5, the bore 37 at the rear end of the spindle is flared, as at 51, and this rear end of the spindle is exteriorily screw-threaded. Surrounding the rear end of the spindle is a hollow head 52 which is interiorly screw-threaded at its rear end, and disposed within this screw-threaded portion of the head is a housing nut 53 which is annular and carries a conical nozzle 54. This conical or tapered end is disposed within the flared rear end 51 of the bore 37, this nozzle being provided with a shoulder disposed between the nut 53 and the rear end of the spindle. Surrounding and rotating with the spindle 24 are the internal bearing members 55 and 56 separated by an internal spacing collar 57. Balls or other anti-friction elements 58 surround the bearing members 55 and 56 and roll against the outer bearing members 59 and 60 which fit within the head 52. The central, outer spacing collar 61 separates the outer bearing members 59 and 60. The bearing members 55 and 56 with the collar 57 are forced against the conical projecting end 39ᵃ of the pulley 39 by means of a nut 62 engaging the screw-threaded rear end of the spindle 24. The rear extremity of the nozzle 54 projects out beyond the nut 52 and is exteriorly screw-threaded for engagement with the interior screw-threads of an elbow 63 which is connected by a flexible pipe 64 to a source of water. The water is preferably forced through this pipe by a rotary pump (not shown). The housing nut 53, as will be seen from Fig. 5, is formed with a port 65 at one point in its circumference, and this port alines with a passage 66 leading from the head or housing 52, and forms the means whereby the overflow from the housing or head may be carried off, this outlet branch 65 connecting to a flexible pipe 67. It will, of course, be obvious from the above description that the spindle can rotate freely within the housing 14 and within the head or housing 52 and with reference to the nozzle 54, and that water may be continuously supplied to the port of the spindle and that overflow will be carried off from the branch 66. The overflow passes out through the space between the extremity of the nozzle 54 and the flared end 51 of spindle 24. Should there be no overflow space water would be forced into the ball bearings. This overflow also allows drainage when supply of water is cut off.

In order to provide means whereby the grinding wheel may be adjusted toward or from the axis *a* around which the grinding wheel rotates to thereby finely adjust the depth of cut, I provide means whereby the housing section 14 and the housing section 25 with it may be axially rotated. To this end, I mount upon the forward end of the carrier 10 an approximately annular plate 68 (see Figs. 3 and 8) having an eccentrically disposed, circular opening 69 which fits over the flange 44 of member 14 and which is provided with a marginal flange 70 fitting over an annular rabbet or recess formed in the forward end of the carrier 10. This plate 68 carries at one point on its periphery a bearing bracket 71 supporting a shaft 72 which, at its rear end, carries a ratchet wheel 73, having radially projecting teeth. The opposite end of this shaft 72 carries a worm 74. This worm meshes with a worm wheel 75 loosely mounted on a shaft 76 carried in bearings 77 on the plate 68. One face of the worm wheel 75 carries upon it the clutch teeth 78, and coacting with these clutch teeth is a clutch member 79 mounted upon the shaft 76. A coiled compression spring 80 bears against one of the bearing lugs 77 and against a collar 81 carried by the shaft 76 so that normally the clutch member 79 is urged into engagement with the clutch teeth 78 and thus the worm wheel 75 is clutched to the shaft 76. This shaft between the bearing members 77 carries a worm 82, and at one extremity carries a knurled hand wheel or knob 83. The plate 68 is mounted upon the carrier 10, and surrounding the extremity of the spindle housing 14 is a worm gear wheel 84. This worm gear wheel 84 has its central opening concentric to the axis of the worm gear. This worm gear wheel is attached to the housing members 14 by screws 85. Worm 82 is keyed to shaft 76 by key 82ᵃ.

Coacting with the ratchet wheel 73, as will be later described, and mounted upon the housing section B′ and, therefore, held stationary relative to the rotation of plate 68 and bracket 71 is an upwardly projecting bracket 86 having two passages for the two longitudinally shiftable pins 87 and 88 (see Figs. 10 and 11). The walls of the pin passages in the bracket 86 are slotted, as at 89, and ears 90 project from the pins 87 and 88 and extend into said slots. The rear ends of the pins 87 and 88 are headed, as at 91, and springs 92 urge these pins rearward, that is retract the pins. Mounted upon these pins are the triangular cams 108 and 109. The cam 108 has its angular face, that is the hypotenuse of the triangle, facing downwardly and toward the left in Fig. 8. The other cam 109 has its inclined face or hypotenuse facing upwardly, this triangular face extending downward and toward the left in Fig. 8. Either of these cams is adapted to be manually projected into active position by pressing on the appropriate knob 91, but is normally retracted by the spring 92 and held thereby out of active position.

Mounted upon the shaft 72 rearward of the ratchet wheel 73 is a pawl carrying lever 110. This lever is rotatable with relation to the shaft 72 and is held in place by the screw 111. The ratchet wheel 73 is, of course, fast on shaft 72. This lever projects laterally from its axis in one direction to form the relatively long arm of the lever, and the outer end of this arm is provided with a rearwardly projecting pin 112 carrying a roller 113, as shown best in Fig. 11[a], which roller is adapted, as the plate 68 is rotated, to engage with whichever cam 108 or 109 is projected. This lever 110 carries upon it the substantially triangular pawl 114, which is triangular in form to provide the oppositely projecting teeth 115 and 116 engageable with the ratchet wheel 73. The apex of the triangular pawl is engaged by a spring pressed pin 117 urged toward the pawl by a spring 118, as shown in Fig. 10. The extremity of this pin 117 is rounded and bears against the rounded apex of the pawl and yieldingly holds the pawl in one or the other of its active positions. The opposite extremity of the lever 110 is formed with a reentrantly angled face 119, and disposed on a bracket or lug 120 projecting from the bearing member 71 is a spring projected pin 121 projected toward the angular face 119 of the lever by means of a spring 122. Extending from the bracket 71 and specifically from the bearing portion of this bracket is a lug or extension 123 having a forwardly projecting lug 124 constituting a stop. The base of this bracket 71 is also formed with a forwardly projecting lug 125 constituting a stop. The pawl 114 is adapted to engage with one or the other of these stops. Thus, for instance, referring to Fig. 11[a], when the pawl carrying lever 110 moves downward beyond a certain point, the tooth 116 of the pawl 114 will strike the stop 125 and this will shift the pawl 114 so as to bring its tooth 116 in engagement with the teeth of the ratchet wheel 73 and bring the tooth 115 out of engagement with the teeth of the ratchet wheel 73. On the other hand, if the tooth 116 is engaged with the ratchet wheel 73, then upon an upward movement of the roller carrying end of the lever 114 beyond a certain point, the tooth 115 will strike the stop 124 and the position of the pawl will be reversed. It will be seen that when the operator presses upon one or the other of the pins 87 or 88, the corresponding cam 108 or 109 will be projected into the line of rotation of roller 113, this roller being carried around with the plate 68 and with the main bearing. The roller strikes and glides upon the corresponding cam, and when it is struck the inclined end face of this cam will force the roller downward in one direction, and the pawl 114 will carry the ratchet wheel around in one direction, thus giving a partial revolution to the ratchet wheel 73 and giving a partial rotation to the worm 74. This being engaged with worm gear 75, revolves the worm gear, which in turn revolves the worm 82 and the worm gear wheel 84, thus making an adjustment of the emery wheel cut by moving the worm gear wheel 84 which is attached eccentrically to the rear spindle housing, said housing supporting the front spindle housing 25. After the roller 112 has traveled over the cam, as for instance the cam 108, and has moved off this cam, the lever 110 is brought back to its neutral position by spring plunger 121. When a reverse adjustment of the feed is required, the operator forces out cam 109, for instance, and the roller 113 will move over the upper face of this cam, thus shifting the lever in the opposite direction and thus feeding the ratchet wheel in the opposite direction and feeding the spindle oppositely. The pin which has been shifted to the proper position to operate the cam 108 will, of course, need to be shifted to a reverse position in order to operate the cam 109, and when the operator carries the cam 109 into position to engage the roller, the tooth 115 of pawl 114 will strike the stop 124, thus throwing the pawl into opposite center of the spring plunger 117 and causing the tooth 116 to engage the ratchet teeth. If the pawl strikes the cam 108, a reverse action takes place and the depression of the lever will cause the pawl to strike the stop 125 and the pawl will again be reversed. Thus the pawl is kept in one position or the other until the opposite cam is projected. Of course, as soon as pressure is released from the press buttons 91, either cam will be retracted away from the line of rotation of the roller 113.

For rapid adjustment of the wheel, the operator presses upon the knob or wheel 83, which disengages the clutch member 79, thereby releasing all the automatic feed mechanism, and then by rotating the wheel or knob 83, a direct and rapid adjustment may be secured in the manner above indicated through the action of the worm 82 on the worm wheel 84. Upon the release of the knob or wheel 83, the clutch member 79 is automatically reengaged with the worm gear wheel 75.

It is desirable to provide means whereby the engagement between the worm gear 84 and the worm 82 may be adjusted to take up wear. To this end, the front plate 68 is attached to the carrier or main bearing 10 by means of cap screws 93 passing through slots 94 in the plate 68. Attached to the plate 68 by means of a screw 95 is an eye-bolt or adjusting screw 96, through the eye of which the screw 95 passes, the shank being threaded. This screw-threaded shank 96 passes through a stud 97 which is screwed in the end of the carrier or main bearing 10. The screw 96, of course, passes loosely through the perforation in the stud 97 and on each side of this stud are disposed the knurled nuts 98 and 99. By releasing the cap screws 93, the front plate 68 can be drawn around circumferentially by turning the knurled nut 99, which action draws the worm 82 into deeper mesh with the worm gear 84. After the desired adjustment has been made, the parts are locked in their adjusted position by the lock nut 98 and the cap screws 93.

It will be noted that the pivotal axis of the bearing plate 68 is equi-distant from the axis of rotation of the housing 10 and the axis of rotation of the spindle 24, thus permitting the axis of the spindle 24 to be located in coincidence with the axis of the housing.

Figure 2:
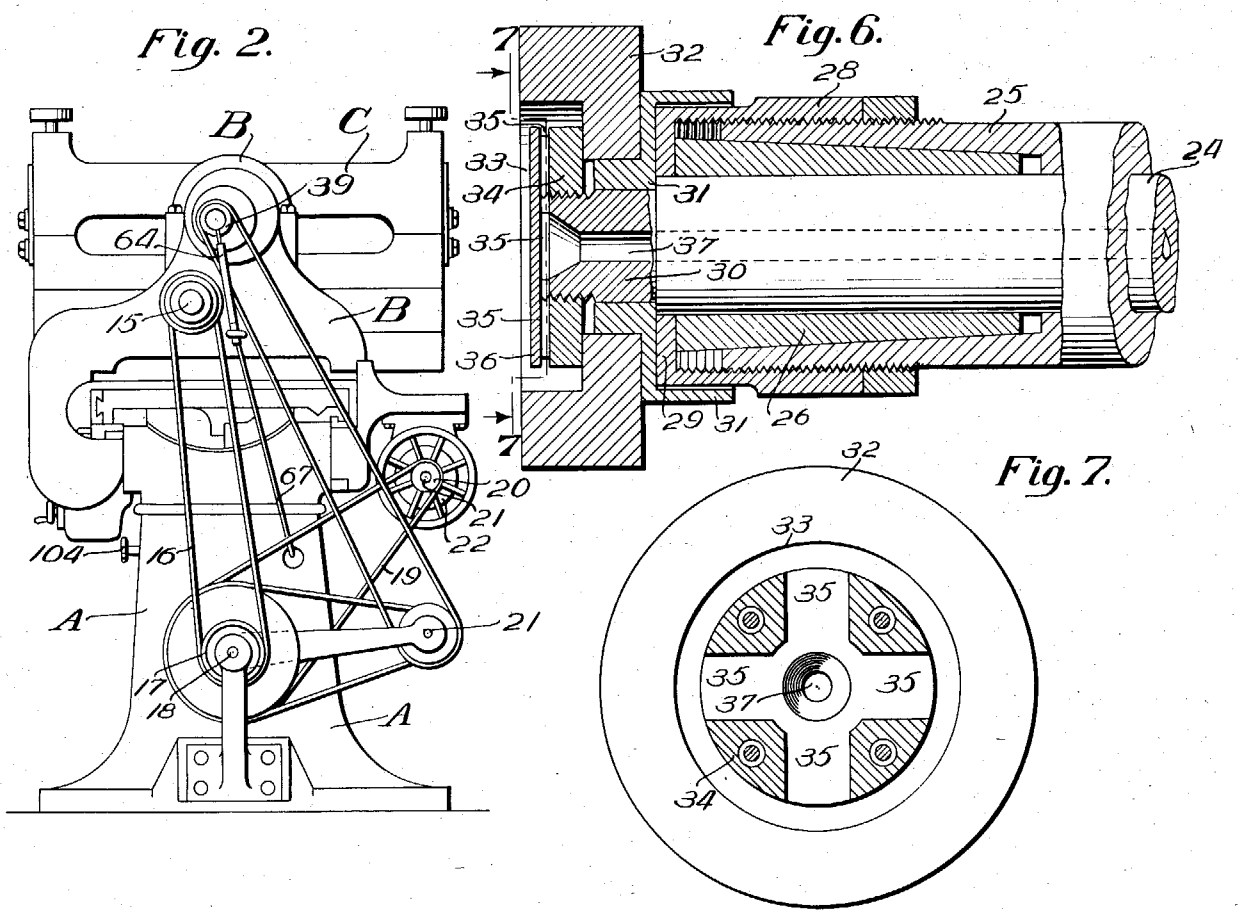
Fig. 2 is a rear end elevation of the machine.

It will be seen from Figs. 1 and 2 that the flexible pipes 64 and 67 extend downward through slot 100 which is formed in a yoke 101 which is rotatably mounted in and projects from the housing wall formed by the supporting column B. This yoke 101 is a freely oscillatable yoke and thus takes care of the independent eccentric action of the head or elbow 52 and permits the free movement of the pipes 64 and 67 rendered necessary by this eccentric action of the various parts.

The work carriage C may be of any suitable design or character and is provided with means whereby it may be longitudinally shifted toward or from the grinding wheel and the work raised or lowered, or the work turned into any desired angle with the axis of the grinding wheel. Of course, it will be understood that other work supporting means may be used in connection with the movable feed table D, and for various kinds of work, as for instance, rods, pins, cylinders, pistons, etc., and that where rods or pins are to be ground, the rod or pin or other work will be rotated and carrier 10 will be idle while spindle 24 will rotate around the axis *a*, and that the same is true of grinding the exterior of a cylinder or piston, but that when interior work is to be ground, the grinding wheel is disposed within the hollow article and revolves around the central axis *a*. Where external grinding is being done, a guard, such as shown in Fig. 14, will be used. This guard 102 is approximately semi-circular in form and embraces the grinding wheel and is provided with a shank portion 103 having clamps whereby it may be engaged with the spindle housing. This guard is preferably in two halves hinged together and is clamped upon the main spindle housing 25 in any desired position. Water will strike the guard and be thrown off upon the revolving work. The pump which supplies water to the spindle is controlled by a knob 104 which, when shifted inward, throws the pump out of gear when the water supply is not desired, and which, when pulled outward, throws the pump into gear. A lever 106 (see Fig. 1) is used for shifting the clutch (not shown) which allows for throwing idle the main bearing 10, that is for causing power to be transmitted to this main bearing 10 or carrier. The throwing of this main bearing 10 idle does not, of course, stop the revolution of the spindle carrying emery wheel. The lever 107 is used for changing the speeds of the movable base D. The clutch mechanism controlled by the lever 106 and the means for securing variable speeds of the table D have not been illustrated, as it is not believed necessary, as these parts are more or less old and well known.

I have not shown in detail the means for operating the work support to thereby feed the work, nor have I shown any means for controlling the speed of the various shafts or the rotating speed of the spindle, or the speed of revolution of the spindle and its grinding wheel around the central axis *a*, as these may be of any desired and obvious contruction.

The general operation of this mechanism will be obvious from what has gone before. The article to be ground or operated on is supported on the movable work support and adjusted to the proper position, and the carrier or main bearing 10 is then rotated through the gear 11 and at the same time the spindle is rotated through the pulleys 38 or 39. When grinding internally, the spindle will be rotated, rotating with it the grinding wheel and at the same time the grinding wheel and spindle will move bodily around the axis *a*. By the means heretofore described, the spindle and grinding wheel may be shifted radially outward or inward, as desired, either automatically by forcing in one or the other of the pins 87 or 88, or by disconnecting the clutch 79 the feed may be rapidly controlled by means of the wheel 83. The feeding means which I have devised provides for an extremely fine adjustment of the feed capable of feeding the cut in fractions of thousandths of an inch while the machine is running. The particular construction of the grinding wheel and the means for supplying water thereto provides for the water being sprayed outward by centrifugal force against the face of the work where the wheel is in direct contact with the work, thereby producing a maximum feed at the point of engagement between the wheel and the work. At the same time, this water passing through the grinding wheel spindle acts to keep the spindle cool. Obviously other liquids than water might be used if desired.

While I have illustrated a construction which has been found thoroughly effective for the purpose intended, yet it will be obvious that many modifications might be made in the details of construction and arrangement of parts without departing from the spirit of the invention.

I claim:—

1. In a mechanism of the character described, a tubular spindle, a grinding wheel mounted thereon and having a recess in one end face, a nut engaging the spindle and bearing against the grinding wheel and disposed in said recessed end face, the outer face of said nut having radially extending grooves, and a baffle plate attached to said nut and extending over said recesses therein.

2. In a mechanism of the character described, a tubular spindle reduced at one end having an exterior screw-threaded extremity, the bore of the spindle flaring toward its extremity, a grinding wheel surrounding the reduced extremity of the spindle and having a recess in its outer end face, and a nut engaging the screw-threaded extremity of the spindle and disposed within said recess, said nut having radial discharge ducts communicating with the bore of the spindle, and a baffle plate attached to the face of said nut and forming the outer wall of the said ducts.

3. In a mechanism of the character described, a tubular, rotatable spindle, a hollow head into which the end of the spindle extends, bearings mounted in said hollow head supporting the spindle, a nozzle carried in the hollow head and projecting loosely into the bore of the spindle, and a supply pipe connected to the nozzle.

4. In a mechanism of the character described, a tubular, rotatable spindle, a hollow head into which the end of the spindle extends, bearings mounted in said hollow head supporting the spindle, a nozzle carried in the hollow head and projecting loosely into the bore of the spindle, a supply pipe connected to the nozzle, and a discharge pipe connected to the head, the head having ducts communicating with the interior of the spindle to carry off the excess liquid.

5. In a mechanism of the character described, a tubular rotatable spindle, bearings supporting the spindle, a fixed hollow head into which the rear end of the spindle projects and open at its opposite ends, anti-friction bearing elements disposed within the hollow head and supporting the rear end of the spindle, a plug detachably closing the rear end of the head, a nozzle carried by said plug and discharging into the bore of the spindle, and a tubular water connection operatively engaged with the nozzle.

6. In a mechanism of the charatcer described, a tubular rotatable spindle, bearings in which the spindle is mounted, a hollow head into which the rear extremity of the spindle projects and having an inturned flange at its forward end, an outer ball race disposed against said flange within the head, an inner ball race mounted on the spindle, anti-friction elements disposed between the races, inner and outer spacing sleeves abutted against the races, an inner and outer race disposed against the rear ends of the spacing sleeves, anti-friction members disposed between said races, a nut engaging the rear extremity of the spindle and bearing against the inner rearmost race, a plug having screw-threaded engagement with the rear end of the head and having a central aperture, the plug being hollowed out to form a circumferentially extending chamber surrounding said nut and having a discharge duct leading from said chamber, a nozzle rotatably mounted in the opening of the plug and confronting the rear end of the spindle and discharging thereinto, the nozzle and rear end of the spindle being spaced from each other to permit the discharge of water through said space into said chamber and duct, and a hollow water supply member engaged with the rear end of said spindle.

7. A mechanism of the character described including a tubular spindle, a grinding wheel mounted thereon for rotation therewith, means for moving the spindle bodily through a circular path eccentric to the axis of the spindle, means at the rear end of the spindle for forcing water into and through the tubular spindle, and means at the rear end of the spindle for carrying off excess water.

8. A mechanism of the character described including a tubular spindle, a grinding wheel mounted thereon for rotation therewith, means for moving the spindle bodily through a circular path eccentric to the axis of the spindle, means at the rear end of the spindle for forcing water into and through the tubular spindle, and means at the rear end of the spindle for carrying off excess water, said means including flexible pipes and a swivelly mounted yoke through which the pipes pass.

9. In a machine for grinding internal cylindrical recesses, a rotatable drum and means for driving it, a spindle journaled in said drum eccentric to the axis thereof whereby the rotation of the drum will impart a bodily rotation to the spindle, means for axially rotating said spindle at a relatively high speed while bodily rotating, a grinding-wheel carried by said spindle, means for continuously forcing liquid along said spindle and delivering it at the grinding-wheel-end thereof, and means for delivering the liquid by centrifugal force at a relatively great velocity against the cylindrical face of the work.

10. In a mechanism of the character described, a rotatable drum and means for driving it, a tubular spindle journaled eccentrically in said drum so as to rotate bodily therewith, means for giving said spindle an independent axial rotation at a relatively high speed while bodily rotating, a grinding-wheel on said spindle, means for continuously forcing liquid through said spindle, an outlet for the liquid being provided at the grinding-wheel-end of the spindle, and means for deflecting the liquid against one face of said grinding-wheel, whereby said liquid is projected outwardly therefrom by centrifugal force at a relatively great velocity against the internal face of the work.

11. In a mechanism of the character described, a rotatable drum and means for driving it, a tubular spindle journaled eccentrically in said drum so as to rotate bodily therewith, means for giving said spindle an independent axial rotation at a relatively high speed while bodily rotating, a grinding-wheel on said spindle, means for continuously forcing liquid through said spindle, an outlet for the liquid being provided at the grinding-wheel-end of the spindle, and means for deflecting the liquid against one face of said grinding-wheel, whereby said liquid is projected outwardly therefrom by centrifugal force at a relatively great velocity against the internal face of the work, said deflecting means being located in a recess in one face of the grinding-wheel.

12. In a machine for grinding internal cylindrical recesses, a tubular spindle mounted for rotation on its own axis and for bodily rotation on an axis eccentric thereto, a grinding wheel carried by said spindle and having a recess in one end face surrounded by an imperforate annular wall, means in said recess having radial passages to conduct streams of liquid against said annular wall whereby the liquid will flow over the face of said wheel and be projected against the wall of the cylindrical recess, said passages having their inner ends in communication with the interior of the tubular spindle, and means for supplying liquid to the interior of the spindle.

13. In a mechanism of the character described, a rotatable drum and means for rotating it, a tubular spindle eccentrically journaled in said drum so as to bodily rotate therewith, means for giving said spindle an independent axial rotation at relatively high speed while bodily rotating, a grinding-wheel on said spindle, and means for continuously delivering liquid to the inlet-end of said tubular spindle during its bodily rotation and axial rotation, said means for continuously delivering the liquid embodying a nozzle having telescopic relation with the inlet-end of the tubular spindle and a housing or head enclosing the nozzle and mounted for bodily movement with the spindle.

14. In a mechanism of the character described, a rotatable drum and means for rotating it, a tubular spindle eccentrically journaled in said drum so as to bodily rotate therewith, means for giving said spindle an independent axial rotation at relatively high speed while bodily rotating, a grinding-wheel on said spindle, and means for continuously delivering liquid to the inlet-end of said tubular spindle during its bodily rotation and axial rotation, said means for continuously delivering the liquid embodying a nozzle freely entering the inlet-end of the tubular spindle and a housing or head enclosing the nozzle, a pipe being connected to the interior of the head or housing to conduct away surplus water.

In testimony whereof, I hereunto affix my signature this 21st day of August, 1923.

HARRY F. JOSEPH.